(12) United States Patent
Vokey et al.

(10) Patent No.: US 10,345,188 B2
(45) Date of Patent: Jul. 9, 2019

(54) SCANNING PLATFORM FOR LOCATING BREACHES IN ROOFING AND WATERPROOFING MEMBRANES WITH CONDUCTIVE SURFACE

(71) Applicant: Detec Systems LLC, Bellingham, WA (US)

(72) Inventors: David Vokey, Sidney (CA); Bryan McGough, Ferndale, WA (US)

(73) Assignee: Detec Systems LLC, Bellingham, WA (US)

(*) Notice: Subject to any disclaimer, the term of this patent is extended or adjusted under 35 U.S.C. 154(b) by 0 days.

(21) Appl. No.: 15/840,597

(22) Filed: Dec. 13, 2017

(65) Prior Publication Data

US 2019/0178744 A1    Jun. 13, 2019

(51) Int. Cl.
| | | |
|---|---|---|
| G01R 31/00 | (2006.01) | |
| G01M 3/16 | (2006.01) | |
| E04D 5/02 | (2006.01) | |
| E04D 13/00 | (2006.01) | |

(52) U.S. Cl.
CPC ............... *G01M 3/16* (2013.01); *E04D 5/02* (2013.01); *E04D 13/006* (2013.01)

(58) Field of Classification Search
USPC ................. 324/693, 694, 714–718, 71.1
See application file for complete search history.

(56) References Cited

U.S. PATENT DOCUMENTS

| | | | | |
|---|---|---|---|---|
| 2004/0100289 A1* | 5/2004 | Lull | ............... | G01F 1/6847 |
| | | | | 324/693 |
| 2012/0313652 A1* | 12/2012 | Jaman | ............... | G01N 27/048 |
| | | | | 324/694 |

* cited by examiner

*Primary Examiner* — Vincent Q Nguyen
(74) *Attorney, Agent, or Firm* — Adrian D. Battison; Ade & Company Inc.; Ryan W. Dupuis

(57) ABSTRACT

A leak in an electrically conductive membrane attached on top of a horizontal roof deck is located by a manually operable carriage which is swept over the upper surface of the membrane on the roof deck. A measuring and switching circuit generates a voltage having a positive attached to the roof deck and a negative attached to conductive brushes on the carriage. The brushes are arranged to form an outer peripheral contact with an inner contact inside the outer contact. There is provided a diode switched into the sensing circuit from the inner conductive brushes so as to reduce the voltage across the deck and the inner brushes relative to the outer brushes. Thus the presence of a leak is detected by the outer set of conductive brushes at distance from the leak and by the inner conductive brush when directly over the leakage site.

12 Claims, 5 Drawing Sheets

SCANNING PLATFORM FOR LOCATING BREACHES IN ROOFING AND WATERPROOFING MEMBRANES WITH CONDUCTIVE SURFACE

This invention relates to a method of locating a leak in a roof, where the roof comprises a generally horizontal roof support deck with a water impermeable membrane applied onto the upper surface of the support deck, where the membrane is moderately electrically conductive as defined in ASTM D4496-13 Standard Test Method for D-C Resistance or Conductance of Moderately Conductive Material.

BACKGROUND OF THE INVENTION

The failure to detect, find and correct minor roof deterioration in the earliest stages is considered the greatest cause of premature roof failure. This is particularly true of roofing materials applied on low-slope or flat roofs. Costly roofing problems are often the result of design deficiencies or faulty application of the roof system, Even when properly designed and applied, all roofing materials deteriorate from contraction and expansion of roof decks and natural aging processes.

Several methods have been used to try and locate roof leaks after they have occurred. Electric capacitance meters identify leaks using a low-frequency that measures dielectric constant changes in the roofing material as a result of moisture below the membrane. Infrared cameras allow technicians to scan roof surfaces for temperature differentials that signify moist areas through changes in thermal conductivity or evaporation. Electric field vector mapping uses a wire loop around the perimeter of the roof surface to introduce an electric potential between the structural deck and a selected roof area which is sprayed with water. The electric field potential caused by a conductive path to any roof membrane damage is then located using a sensitive voltmeter and a pair of probes.

U.S. Pat. No. 4,565,965 issued Jan. 21, 1986 to Geesen discloses an arrangement for detecting leaks in flat roofs in which electrical pulses are transmitted through the moisture in the leak to the roof edge and then the roof is scanned by a pulse sensor and hand-held probe rods to find the leak by locating the maximum amplitude.

The method as described by Geesen requires considerable experience and careful placement of a wire loop around the perimeter of the area to be tested. In particular, metal roof stacks and drains must be isolated by placing secondary loops around them to avoid false readings pointing towards these penetrations.

More recently a scanning platform is described by Vokey in CDN patent 2,613,308 and U.S. Pat. No. 7,554,345 whereby two independent sweep brushes in contact with the surface of the membrane being tested for breaches which penetrate membrane provides a more reliable result.

In all of the above described methods the membranes being tested are required to be electrical insulators. However membranes manufactured using a carbon black component such as ethylene propylene diene monomer (EPDM) or cold applied membranes which contain moisture during a curing process often exhibit a level of conductivity which causes false positives or grounding conditions that invalidates the test.

As described in U.S. Pat. Nos. 2,613,308 and 7,554,345, the outer sweep provides electrical isolation of the inner sweep from external grounds, however the degree of isolation is not sufficient to overcome the grounding effects of membranes which have a moderate level of conductivity.

SUMMARY OF THE INVENTION

According to the invention there is provided a method of locating a leak in a roof, where the roof comprises a generally horizontal roof support deck with a water impermeable membrane which is electrically conductive applied onto the upper surface of the support deck where the membrane is moderately electrically conductive;

the method comprising:

providing a first conductor arrangement and a second conductor arrangement for engaging the roof above the membrane;

providing a return conductor arrangement for electrical connection to the support deck;

applying an electrical voltage between the first conductor arrangement and the roof support deck and between the second conductor arrangement and the roof support deck;

and independently sensing by first and second sensing systems respectively the current flowing from the roof support deck to the first and second conductor arrangements to detect the changes in current as the first and second conductor arrangements are scanned over the selected areas of the roof to locate the leak site in the membrane;

wherein the electric voltage between the roof support deck and the first sensing system is less than the electric voltage between the roof support deck and the second sensing system.

Preferably the electric voltages between the roof support deck and the first and second sensing systems are provided by a common power supply and the electric voltage between the roof support deck and the first sensing system is reduced by providing at least one voltage reducing component between the first conductor arrangement and the second sensing system.

Preferably the voltage reducing component comprises a diode.

Preferably there is provided a switch arrangement for selecting said at least one voltage reducing component from a plurality of components to vary the voltage reduction.

Preferably the method includes mounting the first and second conductor arrangements on a common carriage which can be moved over the roof so as to scan the first and second conductor arrangements over selected areas of the roof.

Preferably the first conductor arrangement is an inner member and the second conductor arrangement is an outer shielding member surrounding the first inner member with both the first inner member and the second outer member engaging the roof.

Preferably the method includes locating the leakage site by detecting changes in the sensed current received by the second outer conductor arrangement at a distance from the leakage site with the second outer conductor arrangement shielding the first inner conductor arrangement to reduce communication of current thereto from the leakage site and detecting the changes in the sensed current received by the first inner conductor arrangement when the first inner conductor member is over the leakage site and the second outer shielding conductor member acts as a shield around the leakage site.

Preferably the membrane is connected to the roof by an intervening layer of an electrically conductive material as disclosed in U.S. Pat. No. 9,244,030 (Vokey) issued Jul. 11, 2013.

In conventional testing systems, the membrane should be an electrical insulator with a conductive surface (the substrate) immediately below the membrane providing a return path for any current that passes through the membrane at a breach. A problem occurs when the membrane is itself partially conductive and looks like a path to the substrate everywhere it is tested.

Preferably the electric voltage difference between the roof support deck and the first sensing system is less than the electric voltage between the roof support deck and the second sensing system by an adjustable amount and the operator adjusts the differential based on the conductivity of the membrane. This can be adjusted so as to be the minimum which provides just enough voltage difference to avoid a false positive alert from the unit.

According to the invention there is also provided an apparatus for locating a leak in a roof, where the roof comprises a generally horizontal roof support deck with a water impermeable membrane applied onto the upper surface of the support deck, the apparatus comprising:

a first and a second conductor arrangement for engaging the roof above the membrane which are electrically isolated from each other;

a carriage carrying the first and second conductor members which can be moved over the roof so as to scan the members over selected areas of the roof;

wherein the first conductor member is an inner member and the second member is an outer shielding member at least partly surrounding the first inner member with both the first inner member and the second outer member engaging the roof;

and a circuit arranged to sense current flowing from the roof support deck to each of the first and second members, the circuit including two independent current sensing systems respectively for the first and second conductor members and the circuit being arranged to detect changes in current as the conductor members are moved over the roof;

at least one voltage reducing component positioned between the first conductor arrangement and the first sensing system;

and a switch arrangement for selecting said at least one voltage reducing component to vary the voltage reduction.

The present invention overcomes the above limitation by modifying and enhancing the isolation capability of the scanning platform method thereby allowing scanning and testing for membrane breaches for roof membranes that exhibit a level of conductivity.

BRIEF DESCRIPTION OF THE DRAWINGS

One embodiment of the invention will now be described in conjunction with the accompanying drawings in which.

DETAILED DESCRIPTION

Figure 1:
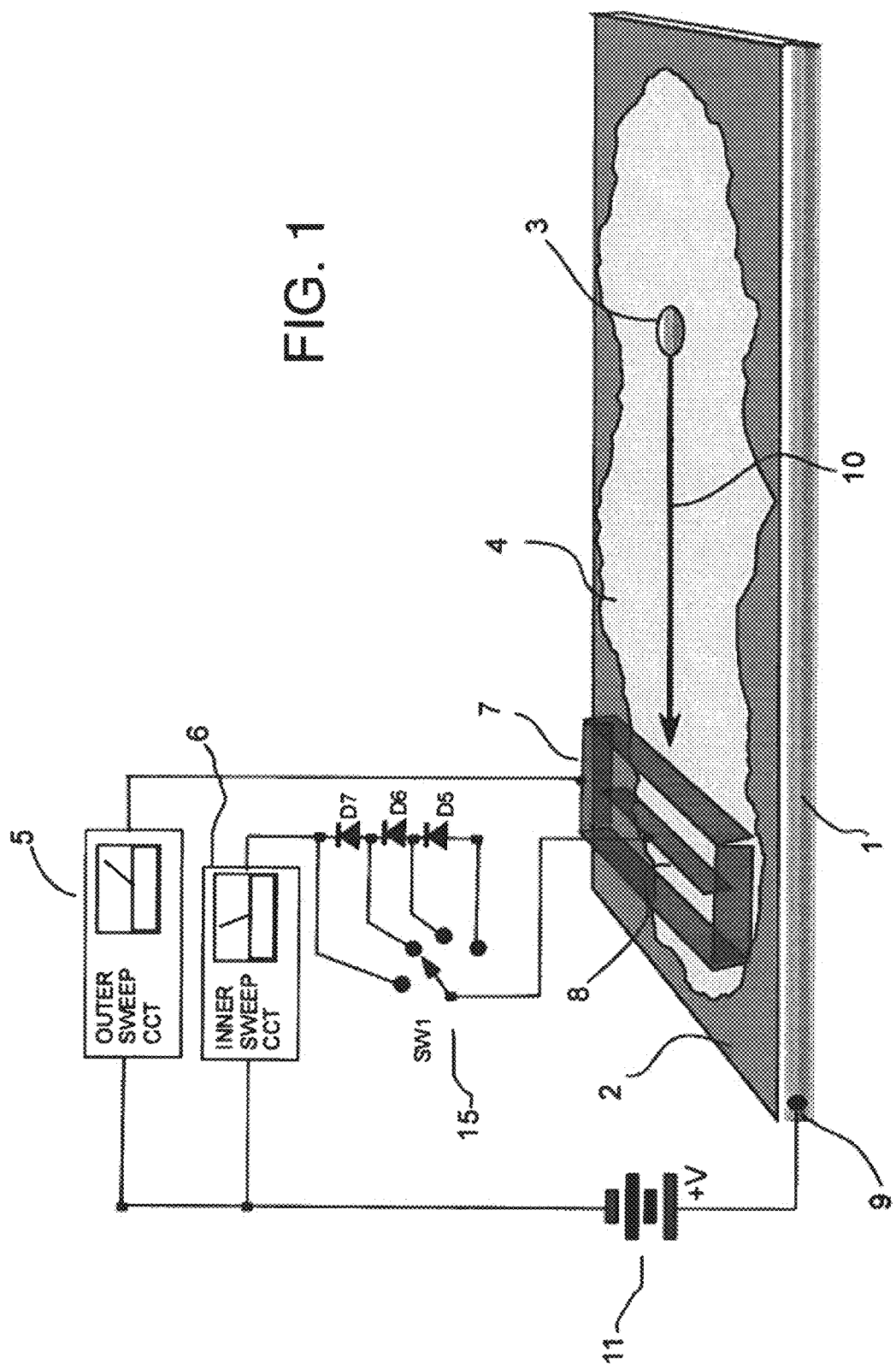
FIG. 1 is an isometric view of a roof membrane on a roof deck including a basic illustration of the first or inner and second or outer sensor brushes and measurement circuits.

Referring now to the drawings, the overall arrangement of the subject roof membrane moisture detection system can best be seen with reference to FIG. 1. A roof membrane 2 is illustrated which is applied as a direct covering layer over a concrete roof deck 1. The deck is typically of concrete but can be of any suitable material to provide the necessary structural strength. The membrane is an impervious material such as plastics or rubber and is sealed at any joints to provide a continuous water barrier over the roof deck. This barrier is intended to provide the leak prevention and any penetration therein caused by a puncture or faulty seal or by wear can allow the moisture to penetrate to the deck where it can cause damage or can continue into the structure to cause damage to internal structures.

The basic operation is shown in FIG. 1. A typical concrete deck 1 over which the water proofing membrane 2 is applied is illustrated. A defect in the membrane 3 allows water 4 to intrude and forms a conductive path to the roof deck. Generally, the waterproofing membrane is an electrical insulator, however for the present method described, a membrane, such as EPDM, with a surface conductivity as low as $1 \times 10^7$ ohms per square can be successfully scanned for water soaked breaches. The conductive outer 7 brushes and inner 8 brushes are placed on the top surface of the membrane 2 with the outer perimeter conductive brushes 7 surrounding the inner brush 8. The brush sets are positioned so as to be in intimate contact with the wetted surface 4 of the test area. The outer sweep detection circuit 5 and inner sweep detection circuit 6 which share a common power supply 11 are connected to the outer brush set 7 and inner brush set 8 respectively with the common positive side of both connected to a grounding point 9 on the deck.

Figure 2:
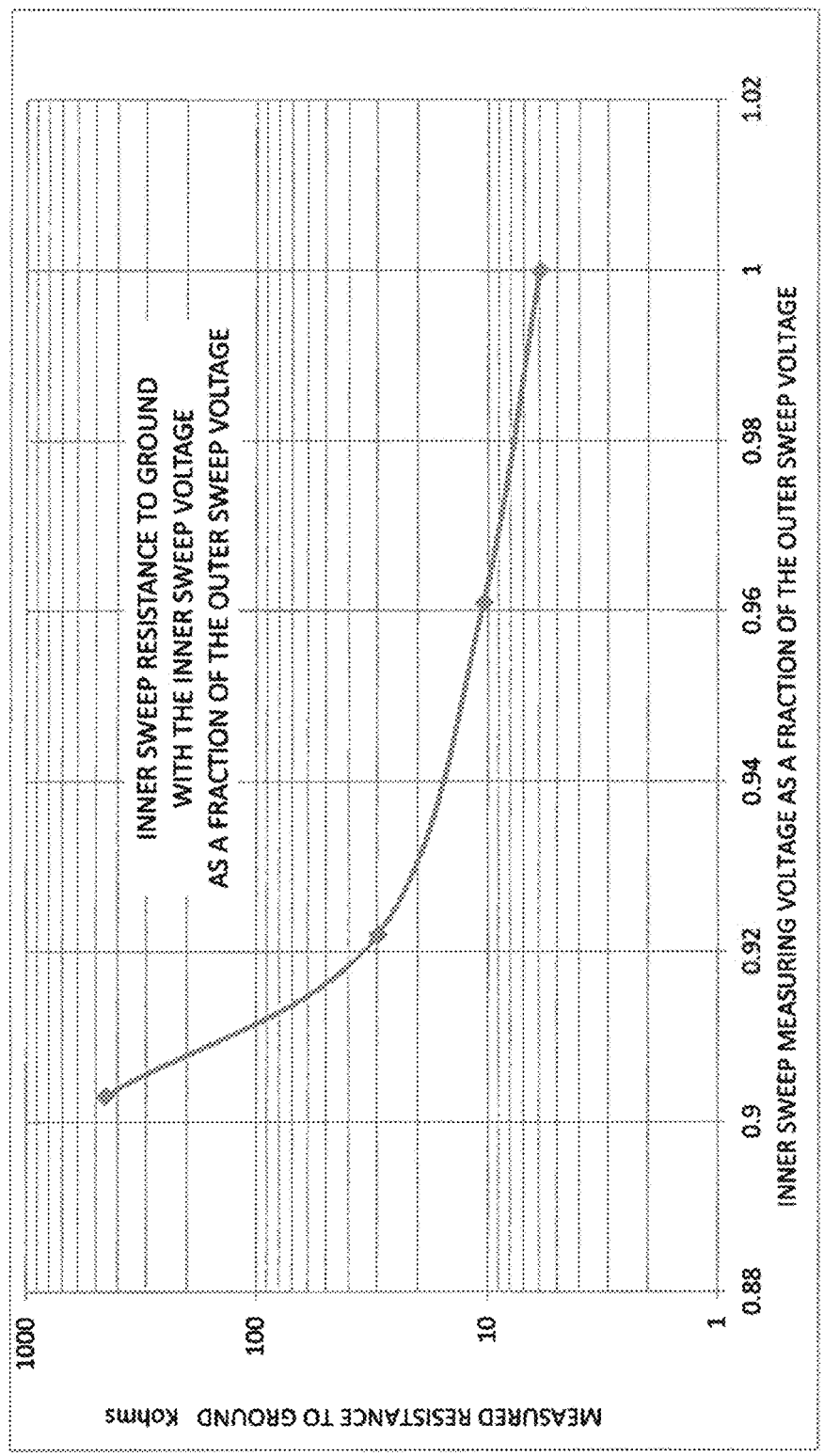
FIG. 2 is a graph showing the membrane resistance to ground as a function of the measuring voltage of the first or inner sensor brushes.

A voltage reduction component 40 is provided as part of the system accessible to and operable by the worker which includes Diodes 5, 6 and 7 which can be switched by a switch SW15 into the return path of the inners sweep circuit. This provides a way to lower the inner sweep voltage relative to the outer sweep voltage. As shown in FIG. 2, a reduction of the inner test voltage from 10 volts to 9 volts or less while the outer sweep remains at 10 volts reduces the apparent resistance to ground as measured by the inner sweep through the EPDM membrane from 60K ohms to approximately 4M ohms. This allows locating water paths to ground when the inner sweep passes directly over a membrane breach.

A DC potential is applied between the roof deck 1 and the wetted area 4. At the membrane damage site 4 there is a conductive path through the membrane and a leakage current 10 travels through the damage point and back to the outer conductive brush 7. The return current picked up by the outer brushes is measured and displayed on the outer sweep circuit 5. As the outer brush perimeter surrounds the inner brush sensor, very little of the return current reaches the inner brush 8. The sweep system is then moved forward over the membrane towards the defect and when the outer brush passes over the damage site, the inner brush picks up the return current and provides a visual and audible alarm. The damage site is thereby located.

Figure 3:
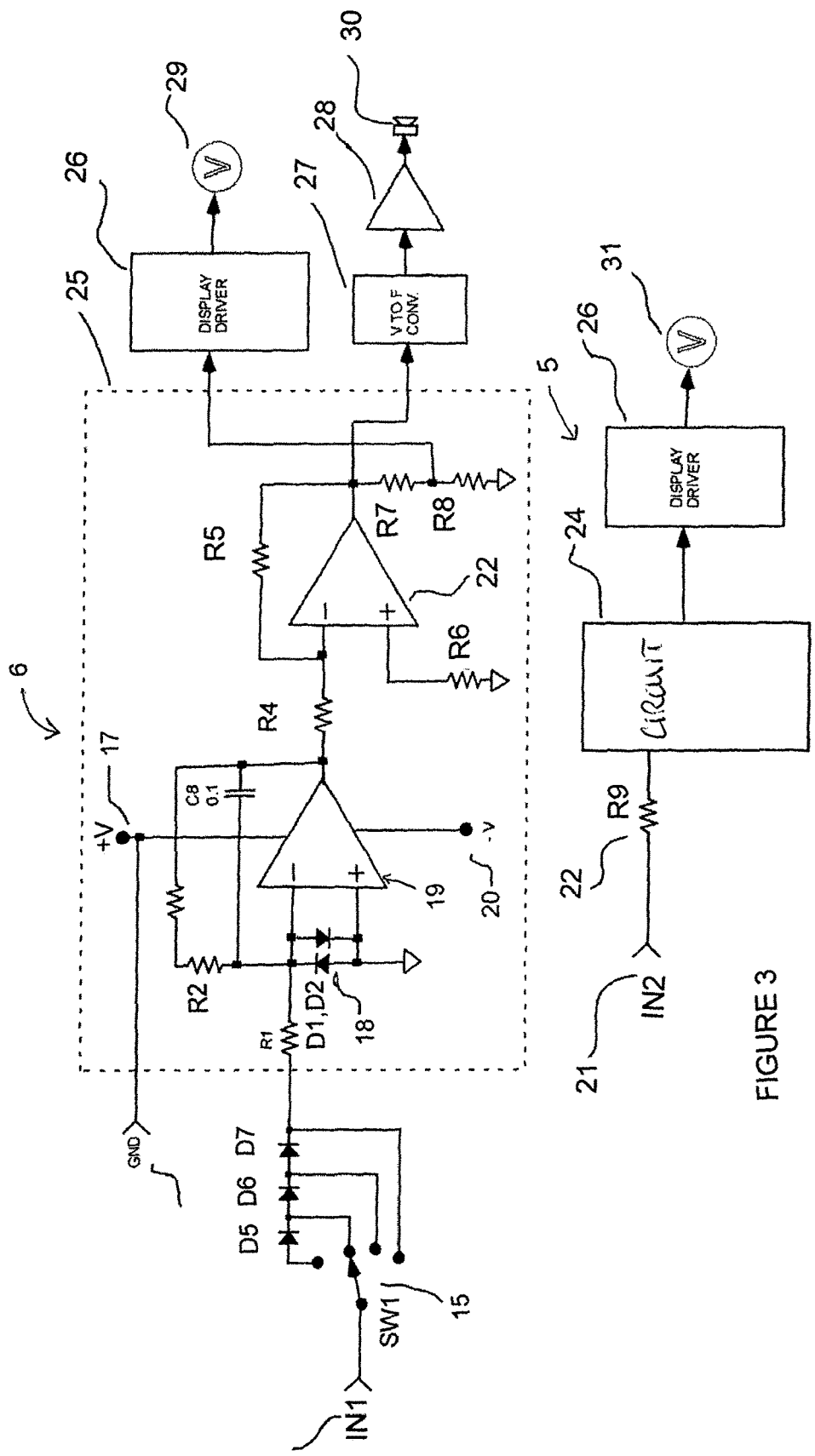
FIG. 3 is a circuit schematic.

A detailed schematic of the detector circuit is shown in FIG. 3. The roof deck connection 9 is connected to the ground terminal 14 which ties the connecting cable from roof deck to the positive supply 17 of the circuit. The connecting lead from the inner brush 8 is connected to the negative summing input of a first stage Amplifier 19. The negative summing input 1 is connected to the selector switch 15. By selecting the position on the switch 15 one, two or three diodes D7,D6,D5 can be placed in series with the negative summing input resistor R1. This action effectively reduces the applied measuring voltage at the inner sweep brush by the voltage drop of the selected diodes which is around 0.5 volts per diode. Diodes D1 and D2 18 and R1 provide input protection. The gain of the first stage is set by Resistors R1 and R2 while Capacitor C1 filters out any unwanted noise. The output of Amplifier 19 is tied to the input of a second Amplifier 22 through Resistor R4. Resistors R4, R5 set the gain of the second stage Amplifier to unity. The positive summing input of Amplifier 15 is tied to common through Resistor R6.

A voltage to frequency converter 27 has an input which is connected to the output of Amplifier 22. The output of the voltage to frequency converter is applied to the input of audio Amplifier 27. The audio output of Amplifier 28 is connected to a speaker 30. The output of Amplifier 22 is applied to voltage divider defined by Resistors R7 and R8 which scales the signal level and applies it to the input of a display driver 26. The display driver 19 is connected to and drives a simulated analog level display 29 of the inner brush.

The entire first and second stage input circuit 25 is duplicated in a second sensing system schematically indicated at 24. The connecting lead from the outer brushes 8 is connected to the input of the second amplifier circuit 24 as indicated at 21. The input circuit resistance 22 of the amplifier circuit 24 is set at around 200 ohms to provide a low resistance path to circuit ground for the current 10 captured by the outer brush 7. The output of the circuit 24 is applied to display driver 26 which drives a simulated analog level display 31 of the outer brush.

Figure 4A:
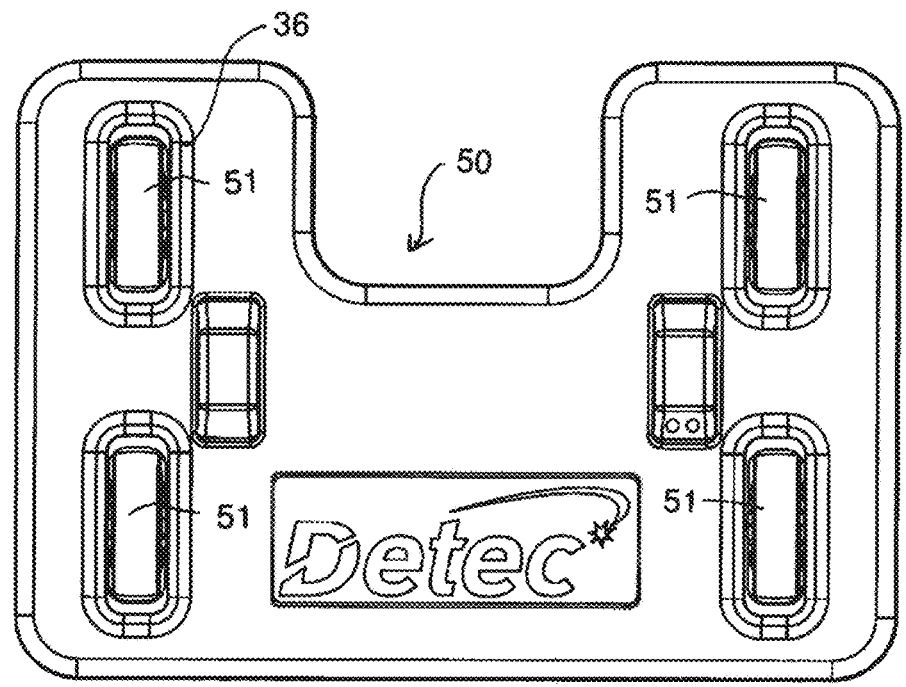
FIGS. 4A, 4B and 4C show an isometric view of the assembly including a front view of a carriage for use in the general method of FIG. 1.
Figure 4B:
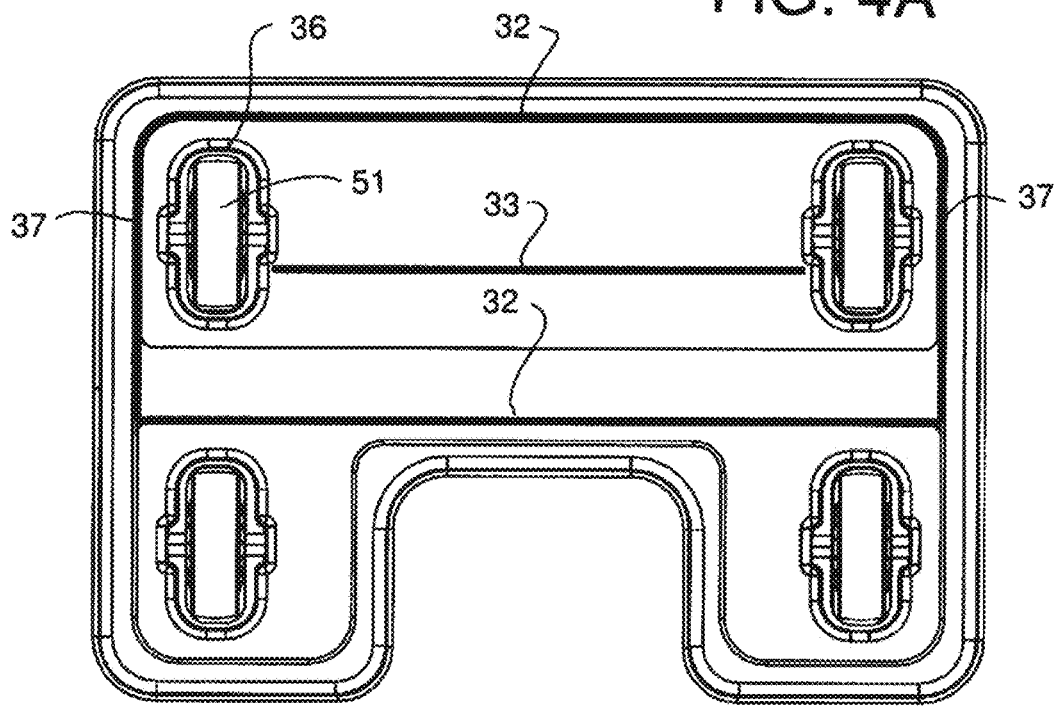
Figure 4C:
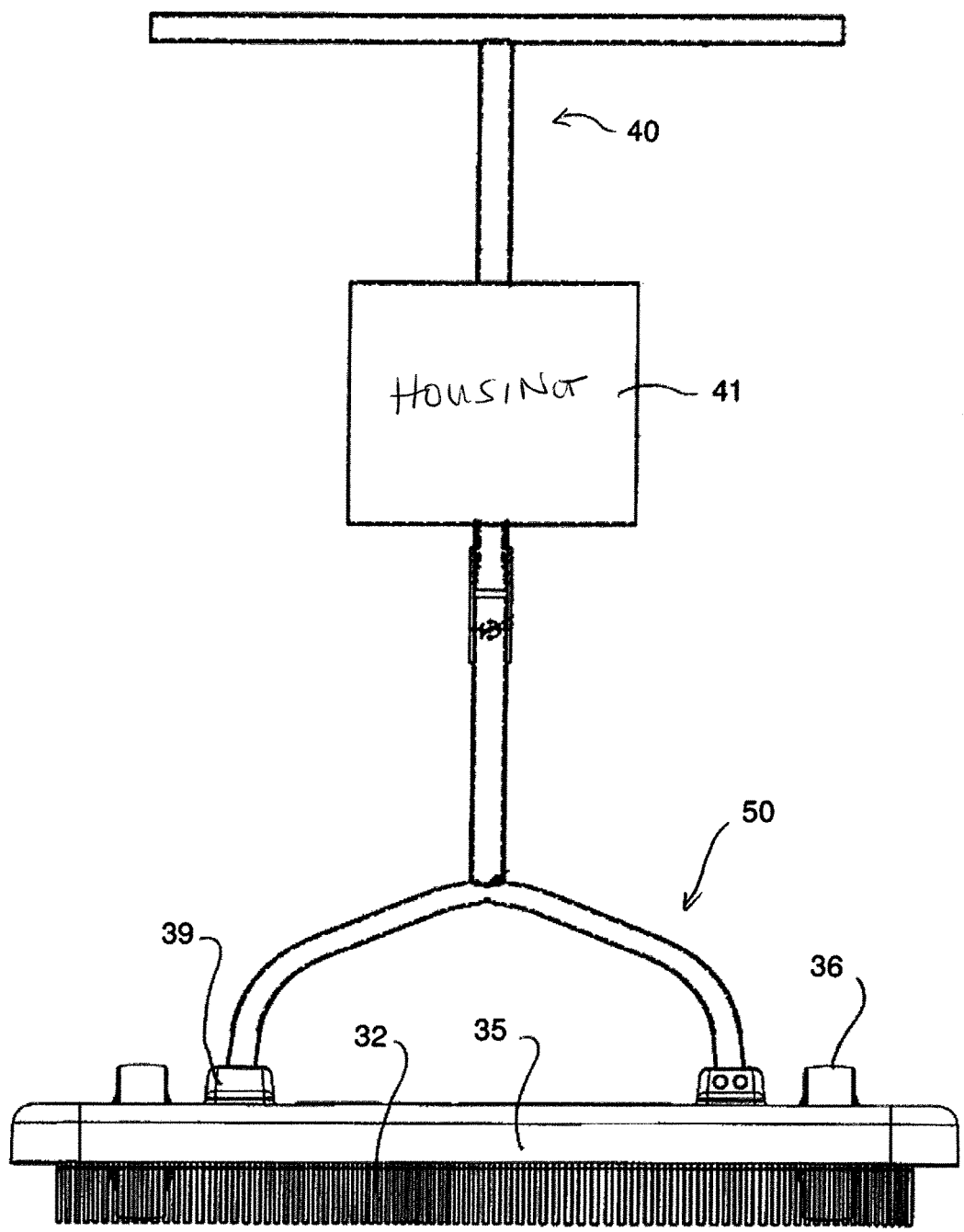

The mechanical arrangement of the apparatus is illustrated in FIG. 4. A horizontal platform or carriage 50 with a flat top wall and a depending side wall 35 forming four sides of a rectangular carriage. The carriage is carried on four swivel wheels or casters 51 attached to the top plate by mountings 36. The carriage supports an outer brush assemblies defined by two parallel front and rear brushes 32 and two parallel side brushes 37, thus defining a rectangular outer area just inside the outside wall of the carriage. Inside the outer rectangular area is provided a single transverse brush defining an inner brush 33. Vertically floating brackets position the outer brushes and allow vertical movement of the brushes as the platform travels over the membrane surface. Similar brackets carry the inner brush. The brushes are formed as a strip from conductive bristles carried on a base so that the base can float upwardly and downwardly from pressure of the roof against the tips of the bristles so that a constant electrical contact is maintained with the roof. A simple manually graspable handle assembly 40 is attached to brackets 39 on the top plate of the carriage. The sweep circuits are mounted in a housing 41 and attached to the handle 40 assembly at a position below a top hand rail of the handle assembly.

Diodes D5 to D7 in series with switch SW1 15 allow selection of the measuring voltage at the inner sweep 8. The membrane should be an electrical insulator with a conductive surface (the substrate) immediately below the membrane providing a return path for any current that passes through the membrane at a breach. A problem occurs when the membrane is partially conductive and looks like a path to the substrate everywhere it is tested.

As shown by the graph, the more diodes in the inner brush path the greater the differential voltage. Each diode provides about a 0.5 volt drop in the inner voltage to ground and is a convenient way of adjusting the differential. The arrangement herein can use a different circuit to accomplish this but this is the simplest method. The operator adjusts the differential based on the conductivity of the membrane using just enough voltage difference to avoid a false positive alert from the unit.

The original design did not have a diode in the circuit and it worked fairly well in avoiding false positives from unintended grounds (drains etc.) external to the platform (carriage). In accordance with the present invention, adding additional voltage dropping diodes greatly improves the false positives from ground outside the platform.

The invention claimed is:

1. A method of locating a leak site in a roof, where the roof comprises a generally horizontal roof support deck with a water impermeable membrane which is electrically conductive applied onto the upper surface of the support deck;
   where the membrane is moderately electrically conductive;
   the method comprising:
   providing a first conductor arrangement and a second conductor arrangement engaging the roof above the membrane;
   providing a return conductor arrangement for electrical connection to the support deck;
   mounting the first conductor arrangement and the second conductor arrangement on a common carriage and moving the common carriage relative to the roof with the first and second conductors thereon between a plurality of different locations on the roof;
   applying a first applied electrical voltage between the first conductor arrangement and the roof support deck and a second applied electrical voltage between the second conductor arrangement and the roof support deck;
   independently sensing, by first and second sensing systems respectively, current flowing between the roof support deck and the first conductor arrangement and current flowing between the roof support and the second conductor arrangement;
   and detecting changes in the current as the first and second conductor arrangements are moved between each of the plurality of different locations as the common carriage is moved relative to the roof to locate the leak site in the water impermeable membrane of the roof;
   wherein the first applied electric voltage between the roof support deck and the first conductor arrangement is less than the second applied electric voltage between the roof support deck and the second conductor arrangement.

2. The method according to claim 1 wherein the electric voltages between the roof support deck and the first and second conductor arrangements are provided by a common power supply and the electric voltage between the roof support deck and the first conductor arrangement is reduced to generate a voltage reduction by providing at least one voltage reducing component between the first conductor arrangement and the first conductor arrangement.

3. The method according to claim 2 wherein said at least one voltage reducing component comprises a diode.

4. The method according to claim 2 wherein there is provided a switch arrangement for selecting said at least one voltage reducing component from a plurality of voltage reducing components to vary the voltage reduction.

5. The method according to claim 1 wherein the first conductor arrangement is an inner member and the second conductor arrangement is an outer shielding member surrounding the first inner member with both the first inner member and the second outer member engaging the roof.

6. The method according to claim including locating the leak site by detecting changes in the sensed current received by the second outer conductor arrangement at a distance from the leak site with the second outer conductor arrangement shielding the first inner conductor arrangement to reduce communication of current thereto from the leak site and detecting the changes in the sensed current received by the first inner conductor arrangement when the first inner conductor member is over the leak site and the second outer shielding conductor member acts as a shield around the leak site.

7. The method according to claim 1 wherein the membrane is connected to the roof by an intervening layer of an electrically conductive material.

8. The method according to claim 1 including adjusting the electric voltage between the roof support deck and the first sensing system relative to the electric voltage between the roof support deck and the second sensing system so that a difference between them is adjusted.

9. The method according to claim 8 including adjusting the difference based on an electrical conductivity of the membrane so that the differences is a minimum which provides just enough voltage difference to avoid a false positive alert.

10. Apparatus for locating a leak site in a roof, where the roof comprises a generally horizontal roof support deck with a water impermeable membrane applied onto the upper surface of the support deck, the apparatus comprising:
- a first and a second conductor arrangement for engaging the roof above the membrane which are electrically isolated from each other;
- a common carriage carrying the first conductor arrangement and the second conductor arrangement on the common carriage;
- the common carriage being movable relative to the roof with the first and second conductors thereon between a plurality of different locations on the roof;
- wherein the first conductor arrangement is an inner member and the second conductor arrangement is an outer shielding member surrounding the first inner member with both the first inner member and the second outer member mounted on the carriage so as to engage the roof;
- a circuit having a voltage source arranged to apply an electrical voltage between the first conductor arrangement and the roof support deck and between the second conductor arrangement and the roof support deck;
- and a circuit arranged to sense current flowing from the roof support deck to each of the first and second members, the circuit including two independent current sensing systems respectively for the first and second conductor members and the circuit being arranged to detect changes in current as the conductor members are moved by the carriage to said plurality of different positions on the roof;
- at least one voltage reducing component in the circuit so as to cause a reduction in the electrical voltage applied by the voltage source between the first conductor arrangement and the roof deck;
- and an arrangement for adjusting said at least one voltage reducing component to vary said reduction in the electrical voltage.

11. The apparatus according to claim 10 wherein said at least one voltage reducing component comprises a diode.

12. The apparatus according to claim 10 wherein said arrangement for adjusting comprises a switch arrangement arranged for selecting said at least one voltage reducing component from a plurality of voltage reduction components to vary said reduction.

\* \* \* \* \*